US011468671B2

(12) United States Patent
Guzik et al.

(10) Patent No.: US 11,468,671 B2
(45) Date of Patent: Oct. 11, 2022

(54) SENTIMENT ANALYSIS FOR SITUATIONAL AWARENESS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US); Ryan Kucera, Columbia Heights, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/107,824

(22) Filed: Nov. 30, 2020

(65) Prior Publication Data

US 2022/0171969 A1 Jun. 2, 2022

(51) Int. Cl.
*G06K 9/00* (2022.01)
*G06V 20/20* (2022.01)
(Continued)

(52) U.S. Cl.
CPC .............. *G06V 20/20* (2022.01); *G06V 20/41* (2022.01); *G06V 20/52* (2022.01); *G06V 40/166* (2022.01); *G06V 40/25* (2022.01); *G06V 20/44* (2022.01)

(58) Field of Classification Search
CPC ........ G06V 20/20; G06V 20/41; G06V 20/52; G06V 40/166; G06V 40/25; G06V 20/44
See application file for complete search history.

(56) References Cited

U.S. PATENT DOCUMENTS

| 6,760,744 B1 | 7/2004 | Halaas et al. |
| 7,917,888 B2 | 3/2011 | Chong et al. |

(Continued)

FOREIGN PATENT DOCUMENTS

| CN | 109671266 B | 11/2020 |
| JP | 2008204219 A | 9/2008 |

(Continued)

OTHER PUBLICATIONS

U.S. Appl. No. 17/107,877, Office Action dated Aug. 18, 2021, 40 pages.

(Continued)

*Primary Examiner* — Dhaval V Patel
(74) *Attorney, Agent, or Firm* — Han Santos, PLLC

(57) ABSTRACT

A Network Operation Center may receive video data, sensor data and third-party data for a situation that a police officer or security service personnel has been called to. Using the video data, a sentiment analysis engine may generate a sentiment data file that contains the sentiment of at least one individual involved in the situation. Using the video data, sensor data, third party data and the sentiment data file, the sentiment analysis engine may generate a safety quality value for the situation. Subsequently, the safety quality value is compared to a predetermined sentiment value to establish a safety rating and confidence interval for the situation. Furthermore, the sentiment analysis engine may generate a situational awareness file, that contains the safety rating and confidence interval, and route it to the field computing device of the officer for evaluation and implementation.

20 Claims, 4 Drawing Sheets

(51) Int. Cl.
*G06V 20/40* (2022.01)
*G06V 20/52* (2022.01)
*G06V 40/20* (2022.01)
*G06V 40/16* (2022.01)

(56) References Cited

U.S. PATENT DOCUMENTS

| | | |
|---|---|---|
| 8,452,722 B2 | 5/2013 | Naeve et al. |
| 8,606,844 B2 | 12/2013 | Kaurman et al. |
| 8,688,320 B2 | 4/2014 | Faenger |
| 9,110,774 B1 | 8/2015 | Bonn et al. |
| 9,264,678 B2 | 2/2016 | Nuyttens et al. |
| 9,449,229 B1 | 9/2016 | Laska et al. |
| 9,483,732 B1* | 11/2016 | Milakovich ........ H04N 21/2668 |
| 9,485,474 B2 | 11/2016 | Kim et al. |
| 9,681,104 B2 | 6/2017 | Billau et al. |
| 9,723,251 B2 | 8/2017 | Slotky |
| 9,738,125 B1 | 8/2017 | Brickley et al. |
| 9,755,890 B2 | 9/2017 | Robertson et al. |
| 9,832,205 B2 | 11/2017 | Santhi et al. |
| 9,848,312 B2 | 12/2017 | Sundel et al. |
| 9,852,132 B2 | 12/2017 | Chhichhia et al. |
| 9,886,261 B1 | 2/2018 | Hotchkies |
| 10,324,773 B2 | 6/2019 | Wing et al. |
| 10,460,014 B2 | 10/2019 | Lloyd et al. |
| 10,540,883 B1 | 1/2020 | Keil et al. |
| 10,902,955 B1 | 1/2021 | Federoff et al. |
| 11,238,290 B2 | 2/2022 | Burns et al. |
| 2003/0081127 A1 | 5/2003 | Kirmuss |
| 2003/0095688 A1 | 5/2003 | Kirmuss |
| 2003/0163512 A1 | 8/2003 | Mikamo |
| 2003/0208679 A1 | 11/2003 | Vazquez |
| 2006/0257001 A1 | 11/2006 | Veen et al. |
| 2008/0147267 A1 | 6/2008 | Plante et al. |
| 2008/0303903 A1 | 12/2008 | Bentley et al. |
| 2009/0150017 A1 | 6/2009 | Caminiti et al. |
| 2009/0210455 A1 | 8/2009 | Sarkar et al. |
| 2009/0248711 A1 | 10/2009 | Martinez et al. |
| 2009/0284359 A1 | 11/2009 | Huang et al. |
| 2010/0036560 A1 | 2/2010 | Wright et al. |
| 2010/0144318 A1 | 6/2010 | Cable |
| 2011/0205068 A1 | 8/2011 | Huynh et al. |
| 2011/0302151 A1 | 12/2011 | Abadi et al. |
| 2012/0084747 A1 | 4/2012 | Chakradhar et al. |
| 2013/0039542 A1* | 2/2013 | Guzik ................... G06F 16/487 382/103 |
| 2013/0344856 A1 | 12/2013 | Silver et al. |
| 2013/0347005 A1 | 12/2013 | Lam et al. |
| 2014/0343796 A1 | 11/2014 | Abuelsaad et al. |
| 2015/0089019 A1 | 3/2015 | Chou |
| 2015/0341370 A1 | 11/2015 | Khan |
| 2016/0042767 A1 | 2/2016 | Araya et al. |
| 2016/0086397 A1 | 3/2016 | Phillips |
| 2016/0153801 A1 | 6/2016 | Cho et al. |
| 2016/0190859 A1 | 6/2016 | Blum et al. |
| 2016/0248856 A1 | 8/2016 | Kao |
| 2016/0371553 A1 | 12/2016 | Farnham, IV et al. |
| 2016/0378607 A1 | 12/2016 | Kumar et al. |
| 2017/0011324 A1 | 1/2017 | Truong et al. |
| 2017/0048482 A1 | 2/2017 | Drake et al. |
| 2017/0148027 A1 | 5/2017 | Yu et al. |
| 2017/0161323 A1 | 6/2017 | Simitsis et al. |
| 2017/0161409 A1 | 6/2017 | Martin |
| 2017/0164062 A1 | 6/2017 | Abramov et al. |
| 2018/0079413 A1 | 3/2018 | Herrero et al. |
| 2018/0145923 A1 | 5/2018 | Chen et al. |
| 2018/0285759 A1 | 10/2018 | Wood et al. |
| 2018/0365909 A1 | 12/2018 | Cheng et al. |
| 2019/0019122 A1 | 1/2019 | Allen |
| 2019/0026665 A1* | 1/2019 | Caskey ................ G06K 9/6228 |
| 2019/0043351 A1* | 2/2019 | Yang ................... G06K 9/00369 |
| 2019/0054925 A1 | 2/2019 | Froeschl et al. |
| 2019/0140886 A1 | 5/2019 | Zywicki et al. |
| 2019/0325354 A1 | 10/2019 | Rajnayak et al. |
| 2020/0007827 A1 | 1/2020 | Saad et al. |
| 2020/0072637 A1 | 3/2020 | Guidotti et al. |
| 2020/0074156 A1 | 3/2020 | Janumpally et al. |
| 2020/0081899 A1 | 3/2020 | Shapur et al. |
| 2020/0145620 A1 | 5/2020 | Alcantara et al. |
| 2020/0151360 A1 | 5/2020 | Zavesky et al. |
| 2020/0172112 A1 | 6/2020 | Kawashima |
| 2020/0211216 A1 | 7/2020 | Hagio et al. |
| 2020/0304854 A1* | 9/2020 | Baumgartner ..... H04N 21/2187 |
| 2020/0312046 A1 | 10/2020 | Righi et al. |
| 2020/0351381 A1 | 11/2020 | Lacey et al. |
| 2021/0076002 A1* | 3/2021 | Peters ................ G06K 9/00718 |
| 2021/0089374 A1 | 3/2021 | Watson et al. |
| 2021/0133808 A1 | 5/2021 | Chan et al. |
| 2021/0272702 A1 | 9/2021 | Hakami |
| 2021/0297929 A1* | 9/2021 | Frusina ................ H04L 45/42 |
| 2021/0377205 A1 | 12/2021 | Brown et al. |
| 2022/0014907 A1 | 1/2022 | Boyd et al. |
| 2022/0169258 A1 | 6/2022 | Samarthyam et al. |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

U.S. Appl. No. 17/107,891, Final Office Action dated Aug. 5, 2021, 21 pages.
U.S. Appl. No. 17/107,891, Office Action dated Apr. 1, 2021, 22 pages.
International Patent Application No. PCT/US2021/060890, International Search Report and Written Opinion dated Mar. 21, 2022, 11 pages.
International Patent Application No. PCT/US2021/060892, International Search Report and Written Opinion dated Mar. 21, 2022, 10 pages.
International Patent Application No. PCT/US2021/060893, International Search Report and Written Opinion dated Mar. 21, 2022, 9 pages.
International Patent Application No. PCT/US2021/060894, International Search Report and Written Opinion dated Mar. 21, 2022, 9 pages.
International Patent Application No. PCT/US2021/060895, International Search Report and Written Opinion dated Mar. 21, 2022, 9 pages.
International Patent Application No. PCT/US2021/060896, International Search Report and Written Opinion dated Mar. 14, 2022, 11 pages.
Juan Rendon et al. Structural combination of neural network models. 2016 IEEE 16th International Conference on Data Mining Workshops (ICDMW). IEEE. Dec. 12, 2016, pp. 406-413. Section II; and figure 2.
Massimo Bonavita et al. Machine Learning for Model Error Inference and Correction. Journal of Advances in Modeling Earth Systems. Nov. 13, 2020, pp. 1-22. Section 2.1; and figure 1.
MD Manjurul Ahsan et al. Deep MLP-CNN Model Using Mixed-Data to Distinguish between COVID-19 and Non-DOVID-19 Patients. Symmetry 2020. Sep. 16, 2020, pp. 1-14. Section 2; and figure 3.
U.S. Appl. No. 17/107,764, Office Action dated Dec. 8, 2021, 38 pages.
U.S. Appl. No. 17/107,877, Final Office Action dated Dec. 29, 2021, 40 pages.
U.S. U.S. Appl. No. 17/107,891, Notice of Allowance dated Nov. 2, 2021, 23 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium an Computational Intelligence in Ensemble Learning (CIEL). IEEE, Dec. 9, 2014, pp. 1-6.
U.S. Appl. No. 17/107,708, Office Action dated May 9, 2022, 57 pages.

(56) References Cited

OTHER PUBLICATIONS

U.S. Appl. No. 17/107,785, Final Office Action dated May 11, 2022, 9 pages.
U.S. Appl. No. 17/107,785, Office Action dated Mar. 29, 2022, 30 pages.
U.S. Appl. No. 17/107,764, Notice of Allowance dated May 26, 2022, 26 pages.
U.S. Appl. No. 17/107,785, Office Action dated Jul. 7, 2022, 21 pages.
U.S. Appl. No. 17/107,830, Office Action dated Jun. 7, 2022, 51 pages.
U.S. Appl. No. 17/107,708, Final Office Action dated Aug. 19, 2022, 52 pages.
U.S. Appl. No. 17/107,714. Office Action dated Aug. 18, 2022, 66 pages.
U.S. Appl. No. 17/107,877, Notice of Allowance dated Aug. 22, 2022, 40 pages.

* cited by examiner

SENTIMENT ANALYSIS FOR SITUATIONAL AWARENESS

BACKGROUND

Police officers and security service personnel who enforce the law and protect law abiding citizens are under constant pressure to assess the situations that they are involved in. They can be under constant threat from unknown forces or individuals who are committed to break the law, threaten citizens, and harm the stability of the general population. Additionally, once dispatched to a situation, police officers may have incomplete information on the circumstances and contextual information of situations may not be available. As a result, police officers are required to continually scan the surroundings and people in their immediate proximity to continually assess the threat to themselves and the general population. This produces constant stress on the individual police officers and may introduce a level of uncertainty or error in the assessed situations.

For example, a police officer may interpret a benevolent gesture as a threat, which results in an overreaction by the police office to the situation. Alternatively, the police officer may underestimate or miss clues exhibited by individuals who are committed to do harm and, in the end, the police officer may be tangled in a situation where the overwhelming force is against the police officer. In such a case, the police officer or security service personnel may be unable to protect himself and others from the harm planned by lawless individuals.

BRIEF DESCRIPTION OF THE DRAWINGS

The detailed description is depicted with reference to the accompanying figures, in which the left most digit(s) of a reference number identifies the figure in which the reference number first appears. The use of the same reference numbers in different figures indicates similar or identical items.

DETAILED DESCRIPTION

This disclosure is directed to techniques for implementing a system that provides sentiment analyses for situations that police officers and security service personnel may find themselves in. The system generates a measure of situational awareness and provides a police officer and/or security service personnel with data and information that deems the situation safe or dangerous for the police officer and/or security service personnel, and other individuals on the scene. The system is designed to receive a video data file from the police officer's body video camera, video data files from other video cameras, information from various sensors located on the police officer, or police vehicle and $3^{rd}$ party data to determine if the situation the police officer is actively investigating is safe or dangerous. The data collected by the video cameras may include individuals or groups of individuals involved in a situation, individuals or groups of individuals in the proximate space of a situation, signs and posters involved in or near a situation, etc. The sensors may collect the police officer's vital signs to establish the police officer's sentiment or the effect of the situation on the police officer's mental disposition.

Additionally, the system may receive neighborhood data of the situation location that includes historical crime data, demographic trends, socioeconomic data, etc.

The array of video cameras and sensors may collect live data and route it to the Network Operation Center (NOC), via a network, for analysis and processing. At the NOC, the individual data streams are analyzed, using a machine learning algorithm and model, and given a rating that indicates the severity, relative danger, or probable risks of the situation. This is known as the sentiment analysis. The overall sentiment analysis, established from all data feeds, is then compared to a predetermined sentiment to assess the safety of the situation. The predetermined sentiment is a threshold value or a minimum value beyond which there is a change in the safety of the situation. Additionally, the sentiment analysis is then given a confidence interval, which is a probability of the accuracy of the sentiment analysis. The sentiment analysis and confidence interval are routed to the police officer or security service personnel for a determination of the risk to initiate an encounter with an individual or group of individuals involved in the situation.

Illustrative System Architecture

Figure 1:
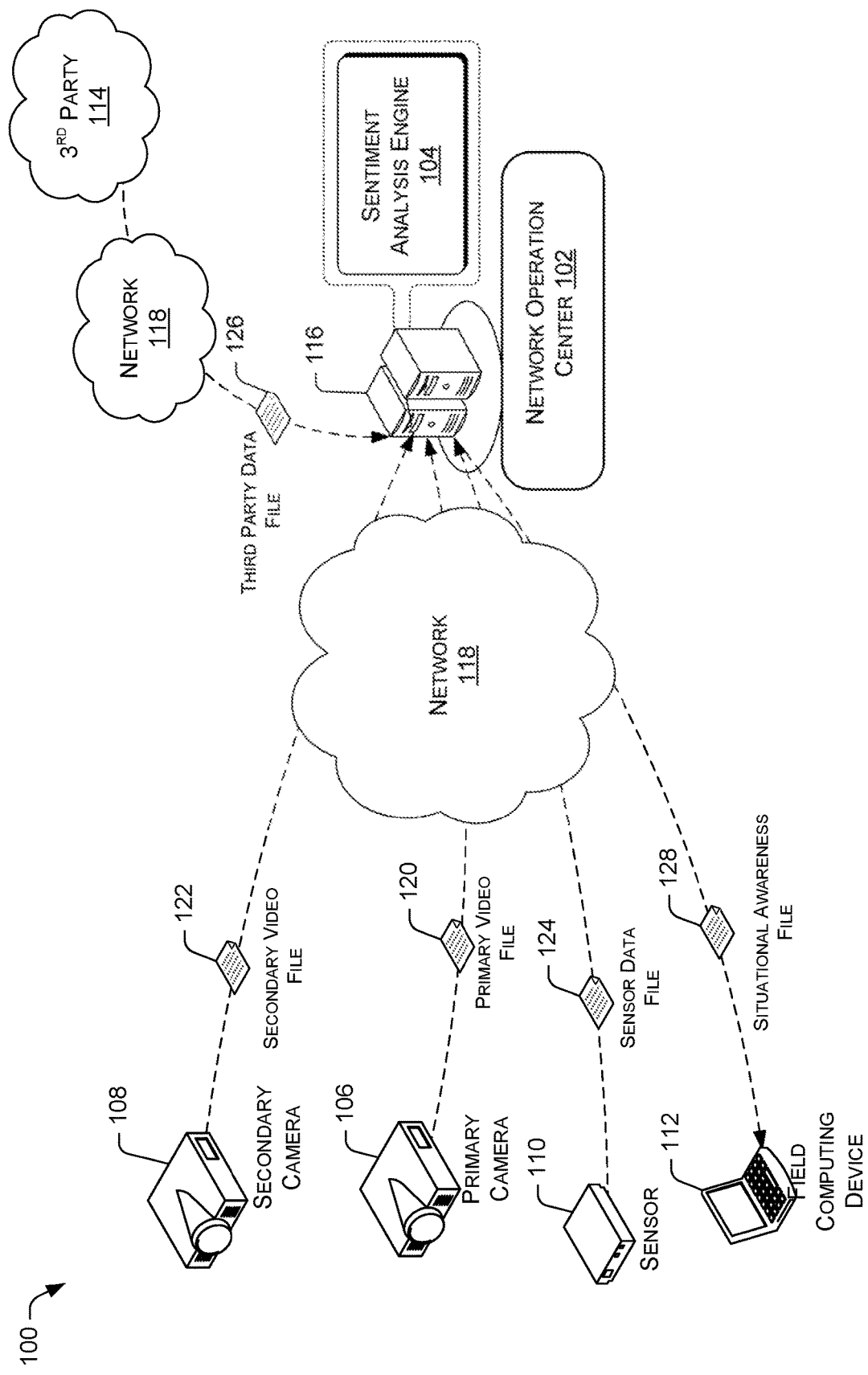
FIG. 1 illustrates an example architecture for implementing sentiment analysis for situational awareness.

FIG. 1 is a schematic diagram of an illustrative computing environment 100 for using a NOC to determine if a situation is safe, or to determine a measure or probability of risk or danger, for a police officer or security service personnel to engage, or make contact, with another individual or group of individuals involved in a situation. A situation consists of the purpose for the police officer traveling or being called to a specific location. The computing environment shows a NOC 102, with a sentiment analysis engine 104, that provides the system to calculate the sentiment analysis and confidence interval for the given situation. The NOC 102 is communicatively connected with a primary video camera 106, a secondary video camera 108, at least one sensor 110, the police officer field computing device 112, and at least one third party 114.

The servers 116, of the NOC 102, may interact with a primary video camera, such as primary camera 106. The primary video camera 106 may include a body camera that is secured to a police officer or a security service officer and is directed to capture the field of view that is directly in front of the police officer. The primary video camera 106 may be secured to the police officer vest, the cap, or anywhere the video camera has the vantage to capture the field of view in front of the police officer. The video feed may be stored in a data file, formatted as an Advanced Video Coding High Definition (AVCHD), Moving Picture Experts Group (MPEG), Movie Digital Video (MOV), Windows Media Video (WMV), or an Audio Video Interleave (AVI) file, prior to routing it to the NOC. In some embodiments, the primary video camera 106, may include multiple video cameras that can capture field of view in multiple directions from the police officer. In the case, the primary video camera feed may include multiple video feeds that are routed to the NOC.

The servers 116, of the NOC 102, may interact with a secondary video camera, such as secondary camera 108. The secondary video camera 108 may include a video camera that is secured to a police vehicle, ancillary police department equipment, utility poles, buildings, drones, aircraft or any video camera that is communicatively connected to the NOC. The video camera 108 may be fixed, but in another embodiment, it may rotate in the horizontal and vertical axis and its movement may be controlled remotely. The secondary video camera may provide a second vantage point to the situation, or may be pointed to individuals that are in close proximity to the situation, signs, etc. Furthermore, in additional embodiments, the NOC 102 may be communicatively connected to multiple video cameras and/or sensors, such that multiple video cameras and/or sensors provide multiple video feeds and/or data streams of the situation from multiple vantage points. For example, video cameras may be mounted to multiple drones that route multiple video and/or audio files to the NOC 102.

The servers 116, of the NOC 102, may interact with at least one sensor, such as sensor 118. The sensor 118 may be a vital sign monitor or a series of vital sign monitors that record the vital statistics of the police officer. At least one sensor may be an integral part of the police officer uniform and/or equipment to constantly monitor the police officer's health and physiological status. For example, the police officer sensors may receive and route to the NOC 102 the police officer's vital statistics, which may include heartbeat rate, blood pressure monitor, etc.

Furthermore, the servers 116, of the NOC 102, may interact with a third-party data service provider, which may provide location relevant data, or data that is relevant for the location, for analysis. The location relevant data may include statistics with respect to population, neighborhood data, and/or crime data of the area of where the situation is taking place. In additional embodiments, the third party may provide background information on the individual or individuals that the police officer may make contact with. Additionally, the third party may include information on the position of additional police officers or other emergency services.

Additionally, the servers 116 of the NOC 102, may interact with a computing device, such as a field computing device 112. The field computing device 112, of the police officer, may be a mobile communication device, a portable computer, a tablet computer, a smart phone, a slate computer, a desktop computer, or any other electronic device that is equipped with network communication components to receive and transmit data, data processing components to process data, and user interface components to receive data from, and present data to, a user. Furthermore, the field computing device 112 may include some type of short-range communication ability that is independent of the network 118.

In additional embodiments, the servers 116 of the NOC 102 may communicate with primary video camera 106, secondary video camera 108, sensor 110, field computing device 112, and third party 114 via a network 118. The network 118 may include one or more local area network (LAN), a larger network such as a wide area network (WAN), a mobile telephone network, and/or a collection of networks, or the Internet. The network may be a wired network, a wireless network, or both.

For the purposes of illustration, FIG. 1 illustrates one primary camera 106, one secondary camera 108, one sensor 110 and one field computing device 112 that are associated to one police officer; however, the system 100 can support or can be scaled to support multiple police officers or security service personnel, to include multiple instances of these devices. In example embodiments, various numbers of instances of equipment or devices can be provided for each officer. In example embodiments, the system 100 may process simultaneously the video/audio feed from multiple video cameras and the data from multiple sensors to assess multiple situations.

The police officer involved in a situation may initiate a communication session with the NOC to assess the risk of the situation. In this case, the video feed from the primary video camera 106 may be routed to the NOC 102, via the primary video file 120, for processing and analysis. The video feed from the secondary video camera 108 may be routed to the NOC 102, via the secondary video file 122, for processing and analysis. Additionally, the data feed from sensor 110 may be routed to the NOC 102, via sensor data file 124, for processing and analysis. Based on the location services for the police officer, the NOC 102 may receive neighborhood data or location crime statistical data via the third-party data file 126, from a third-party service provider, for the area where the situation is taking place.

Subsequently, the sentiment analysis engine 104, which may be implemented by the NOC 102, can process and analyze the data. The sentiment analysis engine 104 may apply a machine learning algorithm to the data to perform a sentiment analysis for the situation and generate an assessment of the situation and/or predict a sentiment for situation. Results of the sentiment analysis may include a safety rating for the situation and a confidence interval for the safety rating.

The observed safety quality value may be used to determine whether the situation is deemed to be acceptably safe or not for the police officer to make contact with the individuals involved in the situation. If the safety quality value is deemed to be superior to the predetermined sentiment value then the situation may be deemed to be safe for the police officer to make contact with the individuals involved in the situation. If the safety quality value is deemed to be inferior to the predetermined sentiment analysis value, then the situation may be deemed to not be safe for the police officer to make contact with the individuals involved in the situation.

A confidence interval and/or confidence level of the sentiment analysis result or prediction may quantify a certainty or probability that the predicted safety is correct.

The sentiment analysis engine 104 may generate a situational awareness file 128 for the situation that may contain the predicted safety rating and confidence interval and confidence level measures for the predicted safety rating. The situational awareness file 128 may be routed to the police officer field computing device 112 for the police officer to consider when making decisions on how to respond to the situation. Based on the sentiment analysis, the police officer may deem the situation to be safe or not safe for contact, and/or may be informed of sentiments or specific qualities of risks that the situation may present.

Example Server Components

Figure 2:
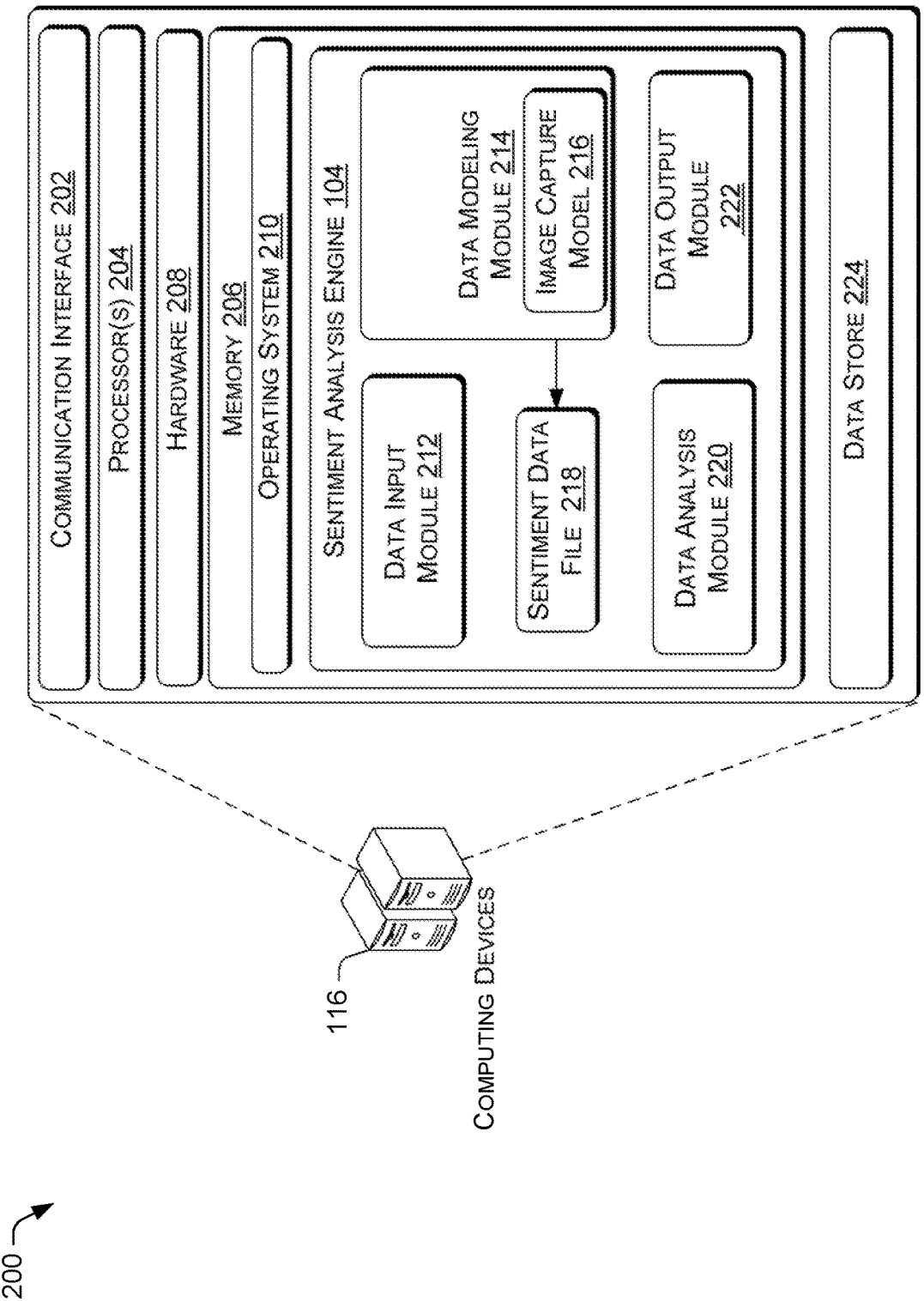
FIG. 2 is a block diagram showing various components of a computing device that implements the sentiment analysis for situational awareness.

FIG. 2 is a block diagram showing various components of the Network Operation Center (NOC) 102 that implements the sentiment analysis engine 104. The sentiment analysis engine 104 may be implemented on one or more computing devices 116 that are part of the NOC 102. The computing devices 116 may include general purpose computers, such as desktop computers, tablet computers, laptop computers, servers, or other electronic devices that are capable of receive inputs, process the inputs, and generate output data. In other embodiments, the computing devices 116 may be virtual computing devices in the form of virtual machines or software containers that are hosted in a cloud. The computing devices 116 may be equipped with a communication interface 202, one or more processors 204, memory 206, and device hardware 208. The communication interface 202 may include wireless and/or wired communication components that enable the computing devices to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The processors 204 and the memory 206 of the computing devices 116 may implement an operating system 210 and the sentiment analysis engine 104. The operating system 210 may include components that enable the computing devices 116 to receive and transmit data via various interfaces (e.g., user controls, communication interface, and/or memory input/output devices), as well as process data using the processors 204 to generate output. The operating system 210 may include a display component that presents the output (e.g., display the data on an electronic display, store the data in memory, transmit the data to another electronic device, etc.). Additionally, the operating system 210 may include other components that perform various additional functions generally associated with an operating system.

The sentiment analysis engine 104 may include a data input module 212, a data modeling module 214, a data analysis module 220, and a data output module 222. The sentiment analysis engine 104 may also interact with a data store 220. These modules may include routines, program instructions, objects, and/or data structures that perform particular tasks or implement particular abstract data types.

The data input module 212 may receive a primary video file 120, a secondary video file 122, a sensor data file 124, and a third-party data file 126 via the network 118. The primary video file 120 may include visual and sound information of individual or individuals involved in the situation for analysis. The analysis may include an examination of the individual's face for identification, an examination of the individual's tone and inflection of the voice, an examination of the individual's cadence of movement, or an examination of any other traits or actions of the individual that may predict the behavior and/or status (physical, emotional, cognitive, and so forth) of the individual. The secondary video file 122 may include visual and sound information of vicinity details that are in proximity to the situation. Example vicinity details may include words, symbols, diagrams and other visual information on yard signs, posters, bumper stickers, t-shirts, and noises or other auditory signals, etc. In additional embodiments, the vicinity details may include visual and sound information of individual or individuals in proximity to the situation for analysis. For example, individuals that are in proximity to the situation may include individuals that are within the police officer's visual range. Individuals that are in proximity to the situation can also include individuals that are perceived by cameras and other sensors that are monitoring the situation. In example embodiments, individuals that are within a predetermined threshold amount of distance to the officer or the situation can be considered to be in proximity, for example within 10 feet, within 20 feet, within 50 feet, or other greater or lesser distance. In example embodiments, individuals that are within a predetermined threshold amount of travel time to the officer and/or the situation can be considered to be in proximity, for example, within a distance that the individual can traverse within a given time interval such as 10 seconds, 5 seconds, or other greater or lesser time interval specified by the officer, the officer's department, or other entity or mechanism. Different distances can apply to different individuals depending on their movement options, for example, whether the individual is on foot, has a skateboard, a bicycle, or a motor vehicle such as a motorcycle or a car. Analysis of individuals in proximity to the situation and/or the officer may include an examination of the individuals' faces for identification, an examination of the individuals' tones and inflection of the voices, an examination of the individuals' cadence of movement, or an examination of any other traits or actions of the individuals that may predict the behavior of the individuals or group of people. The sensor data file 124 may measure physiological activity such as brainwaves, heart function, breathing, muscle activity, and skin temperature of the police officer to sense changes in thinking, emotions, and behavior of the police officer prior to contact with individuals involved in the situation. The third-party data file 126 may include statistics with respect to population in the area, neighborhood data, crime data of the area of where the situation is taking place and identity information of individual or individuals involved in the situation.

The data modeling module 214 may use the primary video file 120 and secondary video file 122 to predict the sentiment of an individual or individuals involved in the situation. The modeling module 214 may include an image processing system to extract a succession or range of image frames from the video feed, creating a file for each image frame with an identifier. For example, each image frame from a video feed may be identified with a tag associated to the video camera and a date and time stamp associated with the creation of the video feed. Subsequently, each image frame may be analyzed by an image capture model 216 to predict the likely sentiment of the individual or individuals that are present at or involved in the situation. The image capture model 216 may apply an algorithm to each image frame to synthesize an individual's face from the image that is subject to various lighting conditions, viewing angles, and facial expressions. Subsequently, data that defines the individual's face may be extracted from the image frame and matched, by comparing the extracted data to a series facial images of a training model, to predict the sentiment of the individual. The label of the training model facial image, that is harmonized to the individual's face extracted from the image frame, defines or indicates sentiment of the individual present at the situation.

The training model may contain a statistically significant number of images of individuals' faces, each labeled with an associated sentiment.

The data modeling module 214 may apply the image capture model to the primary video feed 120, the secondary video feed 122, or any other video feed that captures the situation. Additionally, the data modeling module 214 may extract multiple individual faces from the video feed image frames and predict the sentiment of multiple individuals. The data modeling module 214 may generate sentiment data file 218 for the individual or individuals and associated sentiments involved in the situation. The sentiment data file 218 may include at least one image frames identifier with at last one facial image and the associated sentiment label.

In additional embodiments, the data modeling module 214 may aggregate the sentiments of the individuals involved in the situation and may rate the overall sentiment of the individuals on a linear scale. The linear scale may designate the level of safety for the sentient of the group of individuals, with one designated as a safe and the opposite end of the scale designated as dangerous.

The data analysis module 220 may use machine learning algorithms to generate a safety quality value. Various classification schemes (explicitly and/or implicitly trained) and/or systems may be employed by the data analysis module 220 for the generation of the safety quality value, such as a probabilistic and/or a statistically-based analysis. A classifier is a function that maps an input attribute vector, x=(x1, x2, x3, x4, xn) to a confidence that the input belongs to a class, that is, F(x)=confidence (class). Such classification may employ a probabilistic and/or statistically-based analysis to generate a situational awareness model. A support vector machine is an example of a classifier that may be employed by the data analysis module 220. Other directed and undirected model classification approaches include, e.g., nave Bayes, Bayesian networks, decision trees, neural networks, fuzzy logic models, and probabilistic classification models providing different patterns of independence may also be employed.

The training data that is used by the data analysis module 220 to generate the situational awareness model may include the sentiment data file 128, the third-party data file, the primary video file 120, the secondary video file 122, and the sensor data file 124. The training data may further include previously calculated safety quality values at various locations/neighborhoods. The use of such safety quality values may reduce model generation complexity and/or decrease the generation time of the situational awareness file.

In various embodiments, the data analysis module 220 may predict a safety quality value, or vector of safety quality values, for a given situation. In other words, given a situation, a sentiment model function CM (x, y, z) may provide a safety quality value RS, or a set of safety quality values R (RS1, RS2, . . . , RSN). The values in the set values R are not necessarily order dependent. The sentiment function CM theoretically provides safety quality values for every situation for the domain of the function. In example embodiments, the domain of the function ranges from safe situations to very dangerous situations.

One difficulty in generating a deterministic sentiment model function CM and a safety quality value is that situations and sentiments of individuals are not necessarily static. For example, a neighborhood's crime data generally changes slowly over time, but sentiments of individuals or groups may change very quickly. A sudden action or event may drastically change the overall sentiment of an individual or a group. Accordingly, a proper sentiment model function takes into account not just an individual's sentiment, but also the sentiment of individuals in the proximity of the situation, the sentiment of the police officer, neighborhood data, signs and banners in the proximity of the situation and other environmental inputs. Such an extended sentiment model function CME (x, y, z, N1, N2 . . . Nm, E1, E2, . . . En) may generate RS or set R given not only the sentiment data file 218, but sensor data N1 . . . Nm of the police officer, third-party data E1 . . . En of the neighborhood, etc. Thus, the extended sentiment model CME may generate gradients not just for sentiments for individuals, but also for police officer, other individuals in the proximity of the situation, signs, neighborhoods, and any other environmental conditions. To address the wide range of dynamic changes, the data analysis module 220 may generate an initial safety quality value based on training data. Training data may be collected from different sources, in which the primary training data may be collected via third party data providing crime data for those locations/neighborhoods.

The training data may be supplemented with data extrapolated from other locations/neighborhoods. Specifically, the data analysis module 220 may obtain data, extrapolate such data, and cluster the data based on location/neighborhood conditions and/or sensor and video data. As such, the data analysis module 220 may extrapolate and update safety quality values. In practice, as real-world measured safety quality values are collected, the data analysis module 220 may preferentially use real-world data over training data. Accordingly, the use of training data by the data analysis module 220 may be phased out or updated as historical data is collected. Subsequently, the data analysis module 220 may compare the signal quality value to a predetermined sentiment value. Additionally, the training data and real-world measured data may be used to establish a confidence interval and/or a confidence level for the safety rating value.

The comparison of the safety quality value to the predetermined sentiment value may result in a safety rating for the situation. The predetermined sentiment value may be an established and inputted setting by a user. When the safety quality value fails with respect to the predetermined sentiment value, the safety rating for the situation is predicted to be dangerous. When the safety quality value is superior to the predetermined sentiment value, the safety rating for the situation is predicted to be safe.

The data analysis module 220 may establish a confidence level and a confidence interval for the safety rating as an indicator for the stability of the predicted safety quality value and safety rating. The confidence level and interval may be determined by any series of statistical calculations from the data observed from a sample constructed at a specific confidence level. The statistical calculations may include the computation of mean and standard deviation for the training and real-world data. The confidence interval may establish upper and lower bounds of confidence of the predicted safety rating value.

Subsequently, the data output module 222 may generate a situational awareness file 128 that is specific to the situation and it includes the safety rating and confidence interval. The situational awareness file 128 may be routed to the field computing device 112, of the police officer, to be used as an evaluation tool for the situation.

The data store module 224 may store data that is used by the various modules of the sentiment analysis engine 104. The data store module 224 may include one or more databases, such as relational databases, object databases, object-relational databases, and/or key-value databases. In various embodiments, the data store module 224 may store the training data and updates, safety quality values and updates, safety ratings and updates, and confidence intervals.

Illustrative Operations

Figure 3:
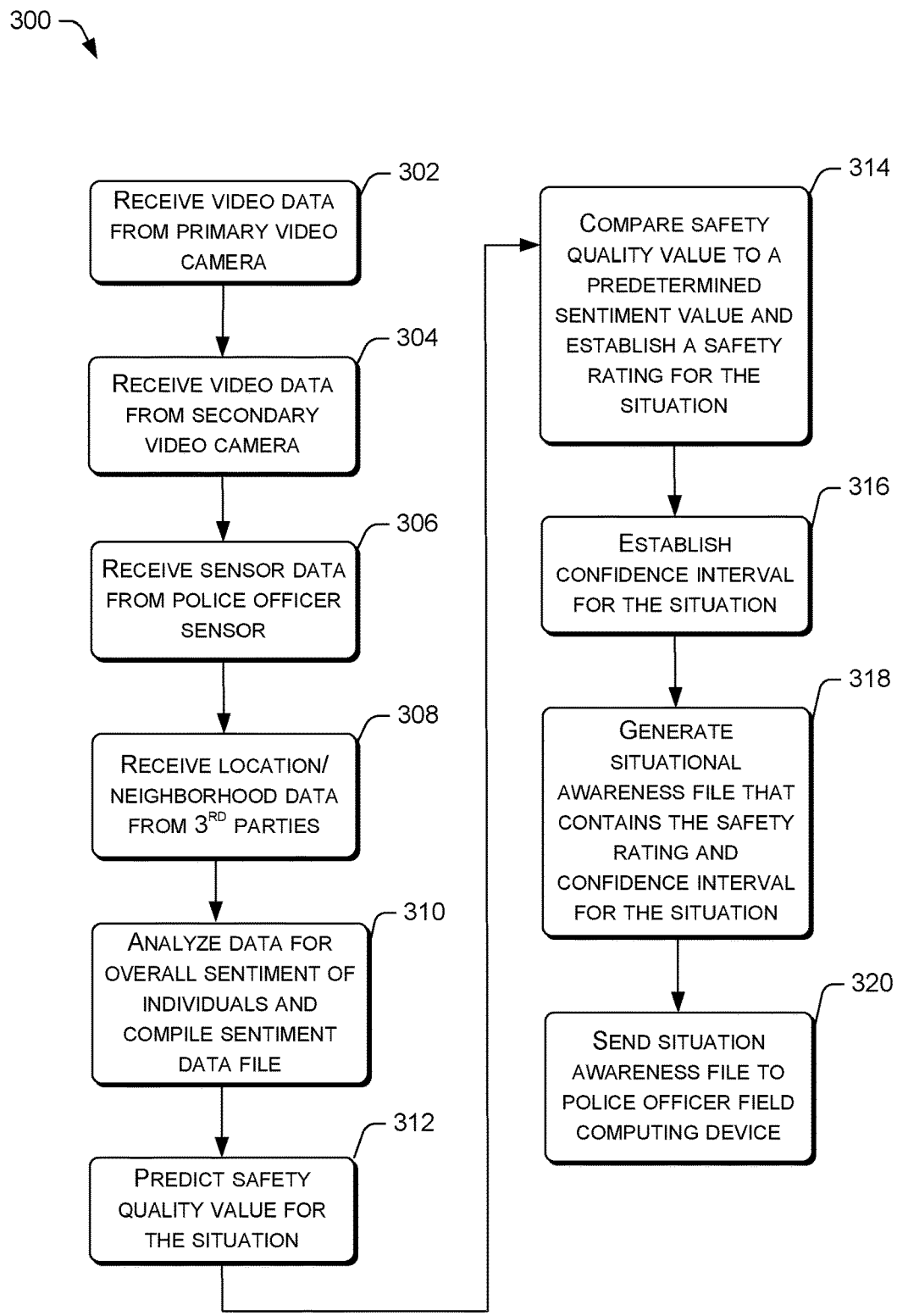
FIG. 3 is a flow diagram of an example process for the sentiment analysis for situational awareness.
Figure 4:
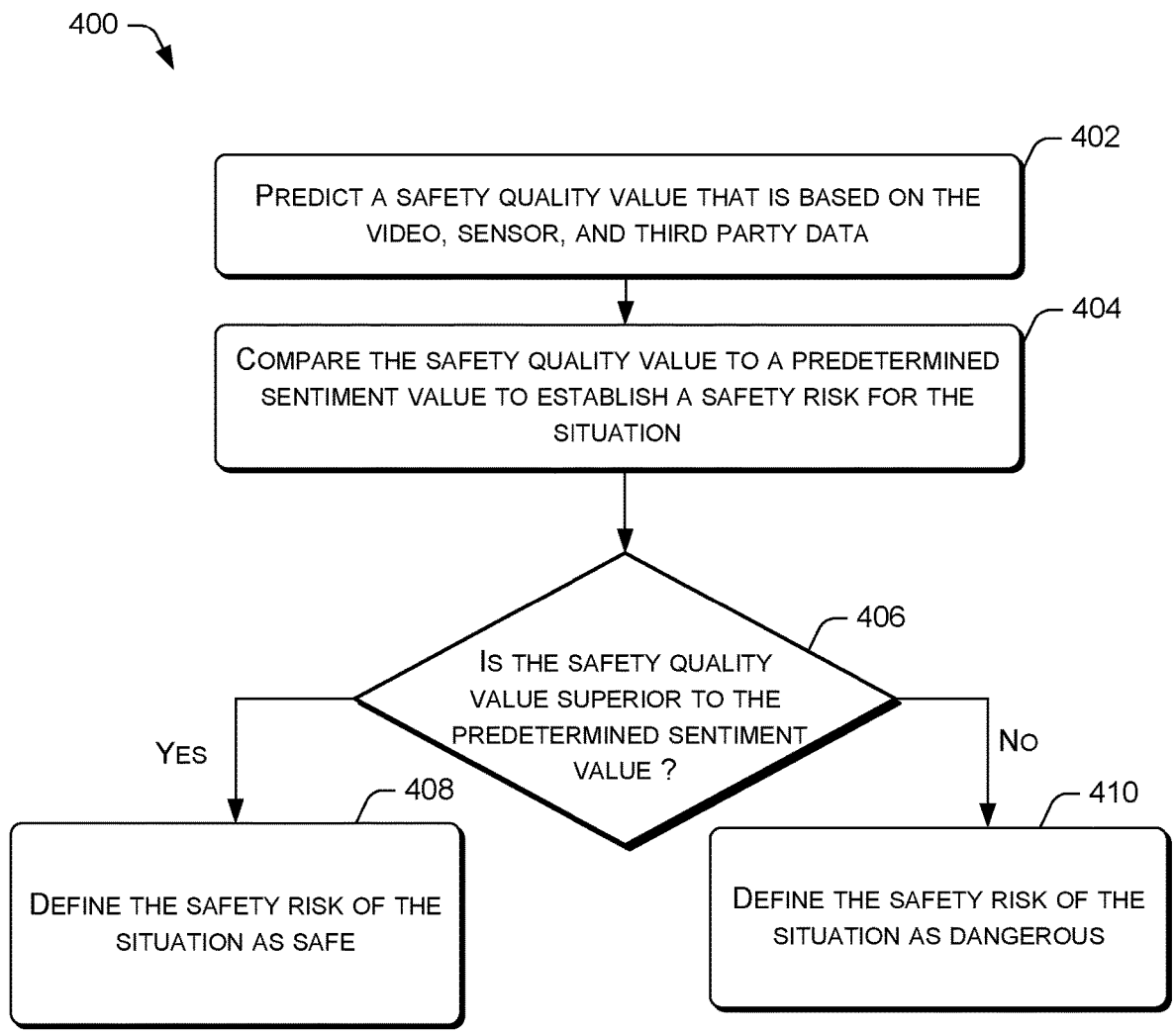
FIG. 4 is a flow diagram of an example process for determining a safety rating for a situation based on sentiment analysis for situational awareness.

FIGS. 3-4 present illustrative processes 300-400 for implementing the sentiment analysis for situational awareness. Each of the processes 300-400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform functions or implement abstract data types. The order in which the operations are described is not intended to be construed as a limitation, and any number of the described blocks can be combined in any order and/or in parallel to implement the process. For discussion purposes, the processes 300-400 are described with reference to auto-replenishment environment 100 of FIG. 1.

FIG. 3 is a flow diagram of an example process for implementing the sentiment analysis for situational awareness. Although, the process 300 shows a primary and secondary video camera and a sensor, the process may include additional video cameras and sensors. Additionally, the NOC 102 may receive data from multiple third parties for a determination of the sentiment. Process 300 illustrates the operation of the video cameras, sensors and third-party data for the calculation of the sentiment for a situation. In actuality, the NOC 102 may support multiple video files and data files for multiple situations.

At block 302, a Network Operation Center (NOC), via a network, may receive a primary video file from a primary video camera of a primary police officer involved in a situation.

At block 304, a Network Operation Center (NOC), via a network, may receive a secondary video file from a secondary video camera of a secondary police officer involved in a situation. In lieu of being attached to a secondary police officer, the secondary video camera may be installed on police equipment, neighboring buildings, vehicles, towers, poles, etc.

At block 306, a Network Operation Center (NOC), via a network, may receive a sensor data file, from a vital sign sensor, that provides the vital signs for the police officer.

At block 308, a Network Operation Center (NOC), via a network, may receive a third-party data file, from a third-party, that provides the location/neighborhood crime data and statistics.

At block 310, a sentiment analysis engine of the NOC, may extract the images of individual faces from the video image files and may apply an algorithm to predict a sentiment of the individuals involved in the situation. The sentiment analysis engine may generate a sentiment data file for the situation that lists the individual or individuals involved in the situation and a predicted sentiment for each individual. Additionally, the sentiment analysis engine may aggregate the sentiments of groups of individuals and may generate an overall sentiment for the entire group.

At block 312, the sentiment analysis engine may implement a machine learning algorithm to predict a safety quality value that is based on the sentiment data file, the primary video file, the secondary video file, the sensor data file and the third-party file.

At block 314, the sentiment analysis engine may compare the safety quality value to a predetermined sentiment value to establish a safety rating for the situation. If the safety quality value is deemed to be superior to the predetermined sentiment value, the sentiment analysis engine establishes a safe safety rating for the situation. If the safety quality value is deemed to be inferior to the predetermined sentiment value, the sentiment analysis engine establishes a dangerous safety rating for the situation.

At block 316, the sentiment analysis engine computes a confidence interval for the safety rating that is based on the training data or developed real-world measured safety quality values.

At block 318, the sentiment analysis engine may develop a situation awareness file that contains the safety rating and the confidence interval for the situation.

At block 320, the network operation center routes the situational awareness file to the police officer field computing device for evaluation and use in making contact with the individual or group of individuals involved in the situation.

FIG. 4 is a flow diagram of an example process 400 for defining the safety rating for a situation that is based on the safety quality value determined by the sentiment analysis engine. At block 402 the sentiment analysis engine may predict a safety quality value that is based on the primary video data, the secondary video data, the sensor data, the third-party data, and the sentiment data file.

At block 404, the sentiment analysis engine may compare the safety quality value for the situation with a predetermined sentiment value to predict a safety rating for the situation.

At decision block 406, if the sentiment analysis engine establishes that the safety quality value is superior to the predetermined sentiment value ("yes" at decision block 404), the process 400 may proceed to block 408. If the sentiment analysis engine establishes that the safety quality value is inferior to the predetermined sentiment value ("no" at decision block 404), the process 400 may proceed to block 410.

At block 408, the sentiment analysis engine labels the situation as safe.

At block 410, the sentiment analysis engine labels the situation as dangerous.

CONCLUSION

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media, of a network operation center, storing computer-executable instructions that upon execution cause one or more processors to perform acts comprising:
receiving a primary video file from a primary video camera for a situation;
receiving a secondary video file from a secondary video camera for the situation;
receiving a sensor data file from a sensor;
predicting a sentiment of individuals associated with the situation to generate a sentiment data file;

predicting a safety quality value based on the primary video file, secondary video file, sentiment data file, and the sensor data file;

comparing the safety quality value with a predetermined sentiment value to establish a safety rating;

generating a situational awareness file that includes the safety rating; and routing the situational awareness file to a police officer field computing device.

2. The one or more non-transitory computer-readable storage media of claim 1, wherein the safety rating is an indicator of stability of the situation that a police officer is investigating.

3. The one or more non-transitory computer-readable storage media of claim 2, wherein the acts further comprise:

in response to a determining of the safety quality value to be superior to the predetermined sentiment value, designating the situation as being safe; and in response to a determining of the safety quality value to be inferior to the predetermined sentiment value, designating the situation as being dangerous.

4. The one or more non-transitory computer-readable storage media of claim 2, wherein the primary video file includes visual and sound data associated with the situation.

5. The one or more non-transitory computer-readable storage media of claim 2, wherein the secondary video file includes visual and sound data of a vicinity that is in proximity to the situation.

6. The one or more non-transitory computer-readable storage media of claim 1, wherein the sensor data file includes vital statistics and physiological activity of a police officer.

7. The one or more non-transitory computer-readable storage media of claim 1, wherein the acts further comprise: receiving a third-party data file that includes historical data of crime data, statistical and trending data of a vicinity that is in proximity to a location of the situation.

8. The one or more non-transitory computer-readable storage media of claim 7, wherein the third-party data file is received from a third-party service provider.

9. The one or more non-transitory computer-readable storage media of claim 1, wherein the sentiment data file is based on data extracted from the primary video file or secondary video file.

10. A system, comprising:

one or more processors; and memory having instructions stored therein, the instructions, when executed by one or more processors, cause the one or more processors to perform acts comprising:

receiving a primary video file from a primary video camera for a situation;

receiving a secondary video file from a secondary video camera for the situation;

receiving a sensor data file from a sensor;

predicting a sentiment of individuals associated with the situation to generate a sentiment data file;

predicting a safety quality value based on the primary video file, secondary video file, sentiment data file, and the sensor data file;

comparing the safety quality value with a predetermined sentiment value to establish a safety rating;

generating a situational awareness file that includes the safety rating; and routing the situational awareness file to a police officer field computing device.

11. The system of claim 10, wherein the safety rating is an indicator of stability of the situation that a police officer is investigating.

12. The system of claim 11, wherein the acts further comprise:

in response to a determining of the safety quality value to be superior to the predetermined sentiment value, designating the situation as being safe; and in response to a determining of the safety quality value to be inferior to the predetermined sentiment value, designating the situation as being dangerous.

13. The system of claim 11, wherein the primary video file includes visual and sound data associated with the situation.

14. The system of claim 11, wherein the secondary video file includes visual and sound data of a vicinity that is in proximity to the situation.

15. The system of claim 10, wherein the sensor data file includes vital statistics and physiological activity of a police officer.

16. The system of claim 10 wherein the acts further comprise: receiving a third-party data file that includes historical data of crime data, statistical and trending data of a vicinity that is in proximity to the location of the situation.

17. The system of claim 16, wherein the third-party data file is received from a third-party service provider.

18. The system of claim 10, wherein the sentiment data file is based on data extracted from the primary video file or secondary video file.

19. A computer-implemented method, comprising:

receiving a primary video file from a primary video camera for a situation;

receiving a secondary video file from a secondary video camera for the situation;

receiving a sensor data file from a sensor associated with a police officer;

predicting a sentiment of individuals associated with the situation to generate a sentiment data file;

predicting a safety quality value based on at least one of the primary video file, secondary video file, sentiment data file, and the sensor data file;

comparing the safety quality value with a predetermined sentiment value to establish a safety rating;

generating a situational awareness file that includes the safety rating; and routing the situational awareness file to a police officer field computing device.

20. The computer-implemented method of claim 19, wherein the safety rating is an indicator of stability of the situation that the police officer is investigating.

* * * * *